United States Patent
Sofue et al.

(10) Patent No.: US 12,237,513 B2
(45) Date of Patent: Feb. 25, 2025

(54) ELECTRODE BINDER COMPOSITION, ELECTRODE COATING COMPOSITION, POWER STORAGE DEVICE ELECTRODE, AND POWER STORAGE DEVICE

(71) Applicant: DKS Co. Ltd., Kyoto (JP)

(72) Inventors: Ayano Sofue, Kyoto (JP); Toshiya Watanabe, Kyoto (JP); Yasuteru Saito, Kyoto (JP)

(73) Assignee: DKS CO. LTD., Kyoto (JP)

(*) Notice: Subject to any disclaimer, the term of this patent is extended or adjusted under 35 U.S.C. 154(b) by 626 days.

(21) Appl. No.: 17/604,156

(22) PCT Filed: Mar. 5, 2020

(86) PCT No.: PCT/JP2020/009403
§ 371 (c)(1),
(2) Date: Oct. 15, 2021

(87) PCT Pub. No.: WO2020/217731
PCT Pub. Date: Oct. 29, 2020

(65) Prior Publication Data
US 2022/0200003 A1  Jun. 23, 2022

(30) Foreign Application Priority Data
Apr. 22, 2019 (JP) .................................. 2019-080600

(51) Int. Cl.
*H01M 4/62* (2006.01)
*H01G 11/06* (2013.01)
*H01G 11/36* (2013.01)
*H01G 11/38* (2013.01)

(52) U.S. Cl.
CPC ............ *H01M 4/623* (2013.01); *H01G 11/06* (2013.01); *H01G 11/36* (2013.01); *H01G 11/38* (2013.01)

(58) Field of Classification Search
None
See application file for complete search history.

(56) References Cited

U.S. PATENT DOCUMENTS

| | | | |
|---|---|---|---|
| 11,955,642 B2* | 4/2024 | Ishibashi | H01M 4/366 |
| 12,040,492 B2* | 7/2024 | Matsumoto | H01M 10/0525 |
| 2014/0212762 A1* | 7/2014 | Nakamura | H01M 4/587 252/502 |
| 2017/0040612 A1 | 2/2017 | Komaba et al. | |
| 2018/0175391 A1* | 6/2018 | Komura | D01D 5/36 |
| 2018/0219222 A1* | 8/2018 | Rojeski | H01M 4/1395 |
| 2018/0290891 A1* | 10/2018 | Gong | H01G 11/86 |
| 2019/0372121 A1* | 12/2019 | Chen | H01M 4/505 |
| 2020/0251720 A1* | 8/2020 | Mukai | H01G 11/54 |
| 2021/0296653 A1* | 9/2021 | Ishibashi | H01M 10/0525 |
| 2021/0403683 A1* | 12/2021 | Akashi | C08B 3/14 |
| 2022/0149376 A1* | 5/2022 | Kim | H01M 4/366 |
| 2022/0158194 A1* | 5/2022 | Kim | H01M 4/62 |
| 2022/0200001 A1* | 6/2022 | Sofue | H01M 4/1393 |

FOREIGN PATENT DOCUMENTS

WO   WO 2015/163302 A1   10/2015

OTHER PUBLICATIONS

International Preliminary Report on Patentability and English translation of the Written Opinion of the International Searching Authority for International Application No. PCT/JP2020/009403, dated Sep. 28, 2021.
International Search Report for International Application No. PCT/JP2020/009403, dated Apr. 21, 2020.

* cited by examiner

*Primary Examiner* — Kevin M Bernatz
(74) *Attorney, Agent, or Firm* — Birch, Stewart, Kolasch & Birch, LLP

(57) ABSTRACT

Provided are an electrode binder composition that provides an electrode that exhibits high durability even when an active material that shows a large volume change is used, a power storage device electrode produced using the electrode binder composition, and a power storage device including the power storage device electrode. An electrode binder composition contains (A) one or more polymers selected from the group consisting of fluoropolymers, butadiene polymers, and thermoplastic elastomers, (B) a fibrous nanocarbon material having an average fiber diameter of 0.5 nm or more and 20 nm or less and a fiber length of 0.5 μm or more and 1 mm or less, (C) a cellulose material, (D) a nanocellulose fiber, and (E) water. The mass ratio between (A) and (B) is (A)/(B)=60/40 to 98/2.

9 Claims, No Drawings

ELECTRODE BINDER COMPOSITION, ELECTRODE COATING COMPOSITION, POWER STORAGE DEVICE ELECTRODE, AND POWER STORAGE DEVICE

TECHNICAL FIELD

The present invention relates to an electrode binder composition, an electrode coating composition produced using the electrode binder composition, a power storage device electrode produced using the coating composition, and a power storage device including the electrode.

BACKGROUND ART

In recent years, power storage devices having high voltages and high energy densities have been required as power sources for driving electronic equipment. In particular, lithium ion secondary batteries, lithium ion capacitors, and the like have been expected to be high-voltage and high-energy-density power storage devices. An electrode used for such a power storage device is produced typically by apply a mixture of electrode active material particles, electrically conductive material particles, and a binder to a current collector surface and drying the mixture. Examples of power storage devices include lithium ion secondary batteries, electric double layer capacitors, and lithium ion capacitors. These power storage device are mainly composed of members such as electrodes, non-aqueous electrolyte solutions, and separators.

Of these, power storage device electrodes are formed by, for example, applying a power storage device electrode mixture liquid obtained by dispersing an electrode active material, an electrically conductive material, and a binder in an organic solvent or water to metal foil serving as a current collector surface and drying the liquid. The properties of a power storage device are greatly influenced, as a matter of course, by electrode particulate materials used and main constituent materials such as an electrolyte and a current collector and are greatly influenced also by a binder, a thickening stabilizer, and a dispersant used as additives.

In particular, in the case of an electrode, an electrode active material, a current collector, and a binder that provides adhesion between them have a great influence on the properties. For example, since the amount and type of active material used determine the amount of lithium ions that can bind to the active material, the use of a larger amount of active material with a higher intrinsic capacity can provide a battery with a higher capacity. When the binder has high adhesive strength between the active materials and between the active material and the current collector, the movement of electrons and lithium ions is facilitated in the electrode to reduce the internal resistance of the electrode, thus enabling highly efficient charge-discharge. In the case of a high capacity battery, a composite-type electrode that includes, as an anode active material, carbon and graphite or carbon and silicon is required, and volume expansion and contraction of the active material occur significantly during charge-discharge. Thus, the binder needs to not only have high adhesive strength but also have high elasticity so that the original adhesive strength and resilience can be maintained if the volume of the electrode repeatedly undergoes considerable expansion and contraction. In addition, it is desirable to uniformly disperse a conductive agent so that an electron conduction path can be retained if a change in electrode volume occurs.

As an example of the case where an active material that contains Si and shows a large volume change is used, PTL 1 has reported a case where an acrylic polymer is used as a binder. In general, an electrode including such a high-strength binder has the feature of not breaking even when a volume change of an active material occurs, but has a problem in that the flexibility of the electrode is difficult to retain and exfoliation and the like during electrode processing tend to occur. In addition, it is said that it is difficult to achieve the dispersibility and rheology controlling properties of electrode materials with an acrylic polymer alone.

CITATION LIST

Patent Literature

PTL 1: International Publication No. 2015/163302

SUMMARY OF INVENTION

Technical Problem

An object of the present invention is to provide an electrode binder composition that provides an electrode that exhibits high durability even when an active material that shows a large volume change is used, an electrode coating composition produced using the electrode binder composition, a power storage device electrode produced using the electrode coating composition, and a power storage device including the power storage device electrode.

Solution to Problem

To achieve the above object, the present inventors conducted intensive studies. During the process of the studies, the inventors focused on a combination of a polymer component and a fibrous nanocarbon material that satisfies given requirements and found that the above problems are solved by combining the polymer component and the fibrous nanocarbon material in a certain ratio, thereby completing the present invention.

Thus, the present invention provides the following [1] to [6].

[1] An electrode binder composition containing (A) one or more polymer components selected from the group consisting of fluoropolymers, butadiene polymers, and thermoplastic elastomers, (B) a fibrous nanocarbon material having an average fiber diameter of 0.5 nm or more and 20 nm or less and an average fiber length of 0.5 µm or more and 1 mm or less, (C) a cellulose material, (D) a nanocellulose fiber, and (E) water, in which the mass ratio of the component (A) to the component (B) satisfies (A)/(B)=60/40 to 98/2.

[2] The composition according to [1], in which the mass ratio of the component (C) to the component (D) satisfies (C)/(D)=30/70 to 98/2.

[3] The electrode binder composition according to [1] or [2], in which a 2 mass % aqueous solution of the component (C), i.e., the cellulose material, has a viscosity (25° C.) of 500 mPa·s or less.

[4] An electrode binder composition containing the electrode binder composition according to any one of [1] to [3], an active material, and a dispersant, in which the component (A) is contained in an amount of 0.1 mass % or more and 10 mass % or less relative to the solid mass of the electrode coating liquid composition, the component (B) is contained in an amount of 0.06 mass % or more and 2 mass % or less relative to the solid mass of the electrode coating liquid composition, and the component (C) is contained in an amount of 0.06 mass % or more and 3 mass % or less relative to the solid mass of the electrode coating liquid composition.

[5] A power storage device electrode produced using the electrode coating liquid composition according to [4].

[6] A power storage device including the power storage device electrode according to [5].

Advantageous Effects of Invention

The electrode binder composition of the present invention has flexibility and adaptability to a volume change, and thus an electrode produced using the electrode binder composition of the present invention has the feature of being less likely to undergo exfoliation during processing. Furthermore, the power storage device provided has high discharge performance and cycle stability. Furthermore, an electrode coating liquid composition produced using the electrode binder composition of the present invention has high dispersion stability and high rheology controlling properties.

DESCRIPTION OF EMBODIMENTS

An embodiment of the present invention will now be described in detail.

An electrode binder composition of the present invention at least contains (A) one or more polymer components selected from the group consisting of fluoropolymers, butadiene polymers, and thermoplastic elastomers, (B) a carbon nanotube having an average fiber diameter of 0.5 nm or more and 20 nm or less and a fiber length of 0.5 μm or more and 1 mm or less, (C) a cellulose material, (D) a nanocellulose fiber, and (E) water.

Examples of the one or more polymer components selected from the group consisting of fluoropolymers, butadiene polymers, and thermoplastic elastomers include, but are not limited to, polyvinylidene fluoride, polyvinylidene fluoride copolymer resins such as copolymers of polyvinylidene fluoride and hexafluoropropylene, perfluoromethyl vinyl ether, and tetrafluoroethylene, fluoropolymers such as polytetrafluoroethylene and fluorocarbon rubber, butadiene polymers such as styrene-butadiene rubber, ethylene-propylene rubber, and styrene-acrylonitrile copolymers, and thermoplastic elastomers such as polyurethane resins, polyester resins, polyimide resins, polyamide resins, and epoxy resins. These polymer components may be used alone or in combination of two or more, or a composite of two or more resins may be used. These polymer components are preferably water-soluble and/or water-dispersible macromolecular compounds.

(B) Fibrous Nanocarbon Material

The fibrous nanocarbon material is composed of a fibrous nanocarbon material having an average fiber diameter of 0.5 nm or more and 20 nm or less and an average fiber length of 0.5 μm or more and 1 mm or less. When the average fiber diameter is less than 0.5 nm, the viscosity of a dispersion of the fibrous nanocarbon material described below is excessively high, and thus it may be difficult to prepare an electrode coating composition. When the average fiber diameter is more than 20 nm, the fibrous nanocarbon material has low flexibility, and thus an electrode mixture layer produced may have low durability, providing a battery with low cycle characteristics. When the fiber length is less than 0.5 μm, an electrode mixture layer with insufficient durability may be provided, and a battery with a short cycle life may be provided. When the fiber length is more than 1 mm, it may be difficult to control the rheology of the dispersion of the fibrous nanocarbon material. The average fiber length and the average fiber width can be determined by, for example, measuring the major-axis diameter of 100 randomly selected fibrous nanocarbon materials in a transmission electron micrograph or scanning probe micrograph and calculating its arithmetic average, that is, a number-average particle size. Examples of the fibrous nanocarbon material include single-walled carbon nanotubes (SWCNTs) and multi-walled carbon nanotubes (MWCNTs), and SWCNTs are suitable for use in terms of the relation between amounts and effects. As the component (B), these compounds may be used alone or in combination of two or more.

The fibrous nanocarbon material is preferably used in the state of being dispersed in a predetermined medium. This dispersion is prepared by dispersing the fibrous nanocarbon material as a raw material in a medium to a nano size by a known method. Water is typically used as the medium, but a polar solvent, such as an alcohol or a ketone solvent, or a mixed solvent of such a polar organic solvent and water may also be used.

For the fibrous nanocarbon material dispersion, the dispersion can be obtained more efficiently by adding the component (C), i.e., the cellulose material, and the component (D), i.e., the nanocellulose fiber as a dispersant and a rheology controlling agent.

Examples of the cellulose material include celluloses such as hydroxymethylcellulose, carboxymethylcellulose, alkali metal salts thereof, methylcellulose, ethylcellulose, hydroxypropylmethylcellulose, and hydroxyethylmethylcellulose. In particular, sodium salt of carboxymethylcellulose is particularly suitable for use. As the nanocellulose fiber, for example, cellulose nanofibers as described in Japanese Patent No. 5626828 and Japanese Patent No. 5921960 are particularly suitable for use. Examples of devices for producing the fibrous nanocarbon material dispersion include jet mills, high-pressure dispersing devices, and ultrasonic homogenizers.

The carboxymethylcellulose salt for use preferably has low viscosity, because when combined with the nanocellulose fiber, the carboxymethylcellulose salt can provide higher dispersibility, facilitates rheology control, and can improve the function of the fibrous nanocarbon. In particular, the viscosity of a 2 mass % aqueous solution of the carboxymethylcellulose salt is preferably 500 mPa·s or less, more preferably 100 mPa·s or less. The lower limit of the viscosity of the 2 mass % aqueous solution may be, for example, 5 mPa·s or more.

Here, the viscosity of the 2 mass % aqueous solution of the carboxymethylcellulose salt is measured as described below. Specifically, the carboxymethylcellulose salt (about 4.4 g) is placed in a stoppered 300 ml Erlenmeyer flask and accurately weighed. Water in an amount calculated by an equation "sample (g)×(98−water amount (mass %)/2)" is added thereto, and the resultant is left to stand for 12 hours and further mixed for 5 minutes. Using the resulting solution, the viscosity at 25° C. is measured in accordance with JIS Z 8803 using a mono-cylinder rotational viscometer.

The mass ratio between (C) the cellulose material and (D) the nanocellulose fiber is preferably (C)/(D)=30/70 to 98/2, more preferably 50/50 to 90/10. When this mass ratio is less than 30/70, the fibrous nanocarbon material dispersion may have excessively high viscosity and thixotropic properties, thus making it difficult to control the application of an electrode coating composition. When this mass ratio is more than 90/10, the dispersibility of the fibrous nanocarbon material may be low.

In the electrode binder composition of the present invention, the mass ratio of (A) the one or more polymer components to (B) the fibrous nanocarbon material is (A)/(B)= 60/40 to 98/2. When this mass ratio is less than 60/40, the flexibility and binding properties of an electrode mixture layer may be low, the viscosity of an electrode coating liquid composition may be very high, thus presenting a problem with electrode formation. When this mass ratio is more than 98/2, the adhesion of an electrode mixture layer may be low, and the resistance of an electrode may be high, thus leading to low battery properties.

The total amount of (C) the cellulose material and (D) the nanocellulose fiber added to the fibrous nanocarbon material is preferably 5 parts by mass or more and 150 parts by mass or less relative to 100 parts by mass of the fibrous nanocarbon. An addition in an amount in this range improves the dispersibility and dispersion stability of the fibrous nanocarbon material and enables the viscosity of an electrode coating composition for producing an electrode to be properly adjusted, thus facilitating electrode production.

The electrode coating liquid composition of the present invention contains the electrode binder composition, and an active material, a conductive assistant, and a dispersant described below. In the electrode coating liquid composition of the present invention, (A) the one or more polymer components are preferably contained in an amount of 0.1 mass % or more and 10 mass % or less relative to the solid mass of the electrode coating liquid composition. When (A) the one or more polymer components are contained in an amount in this range, there is an advantage in that the binding properties of an electrode mixture layer and the electron conductivity of an electrode can be simultaneously achieved. (B) The fibrous nanocarbon material is preferably contained in an amount of 0.06 mass % or more and 2 mass % or less relative to the solid content of the electrode coating liquid composition. When the content of (B) the fibrous nanocarbon material is in this range, there is an advantage in that the rheology properties of the electrode coating liquid composition, the binding properties of an electrode mixture layer, and the electron conductivity of an electrode can be simultaneously achieved. Furthermore, (C) the cellulose material is preferably contained in an amount of 0.06 mass % or more and 3 mass % or less relative to the solid content of the electrode coating liquid composition. When the content of (C) the cellulose material is in this range, there is an advantage in that the rheology properties of the electrode coating liquid composition and the electron conductivity of an electrode can be simultaneously achieved. The total content of the dispersant and the electrode binder composition is preferably 0.5 mass % or more and 10 mass % or less relative to the solid content of the electrode coating liquid composition. In general, although depending on the characteristics of the active material used, when the content is in this range, an electrode coating liquid composition in which the active material and the conductive assistant are dispersed well and which has appropriate thixotropic properties can be obtained. The content is preferably 1 mass % or more, more preferably 1.5 mass % or more, and is preferably 8 mass % or less, more preferably 5 mass % or less.

Separately from the component (C) and the component (D), a dispersant is added to the electrode coating liquid composition of the present invention to the extent that the advantageous effects of the present invention are not impaired. The dispersant preferably contains one or more additives having a dispersion function. The additives having a dispersion function may be any known additives. Specifically, one or more selected from celluloses such as hydroxymethylcellulose, carboxymethylcellulose, alkali metal salts thereof, methylcellulose, ethylcellulose, hydroxypropylmethylcellulose, and hydroxyethylmethylcellulose; cellulose nanofibers such as chemically modified cellulose nanofibers as described in Japanese Patent No. 5626828 and Japanese Patent No. 5921960; polycarboxylic acid compounds such as polyacrylic acid and sodium polyacrylate; compounds having a vinylpyrrolidone structure such as polyvinylpyrrolidone; and polyurethane resins, polyester resins, polyacrylamide, polyethylene oxide, polyvinyl alcohol, sodium alginate, xanthan gum, carrageenan, guar gum, agar, starch, and the like may be used. In particular, carboxymethylcellulose salts are suitable for use.

A conductive assistant is added to the electrode coating liquid composition of the present invention to the extent that the advantageous effects of the present invention are not impaired. The conductive assistant may be any electron conductive material that does not adversely affect the battery performance. Typically, carbon blacks such as acetylene black and ketjen black are used, and conductive materials such as natural graphite (e.g., scale graphite, flake graphite, and earthy graphite), artificial graphite, carbon whiskers, carbon fibers, metal (e.g., copper, nickel, aluminum, silver, and gold) powders, metal fibers, and conductive ceramic materials may also be used. These may be used alone or as a mixture of two or more. The addition amount thereof is preferably 0.1 to 30 wt %, particularly preferably 0.2 to 20 wt %, relative to the amount of active material. The fibrous nanocarbon material, which is a constituent of the binder composition of the present invention, can also function as a conductive assistant.

For the electrode coating liquid composition of the power storage device of the present invention, the method, order, etc. of mixing of the above-described electrode materials are not particularly limited. For example, a conductive assistant, a dispersant, and the binder composition may be mixed in advance and used. Examples of mixing and dispersing devices used for the mixing and dispersing treatment of the composition include, but are not limited to, homodispers, planetary mixers, propeller mixers, kneaders, homogenizers, ultrasonic homogenizers, colloid mills, bead mills, sand mills, and high-pressure homogenizers.

The power storage device of the present invention may be a known power storage device, and specific examples include, but are not limited to, a lithium secondary battery and a lithium ion capacitor.

The positive electrode active material used for a positive electrode of the lithium secondary battery is not particularly limited as long as lithium ions can be intercalated and deintercalated. Examples include metal oxides such as CuO, $Cu_2O$, $MnO_2$, $MoO_3$, $V_2O_5$, $CrO_3$, $MoO_3$, $Fe_2O_3$, $Ni_2O_3$, and $CoO_3$; composite oxides of lithium and transition metals, such as $Li_xCoO_2$, $Li_xNiO_2$, $Li_xMn_2O_4$, and $LiFePO_4$; metal chalcogenides such as $TiS_2$, $MoS_2$, and $NbSe_3$; and conductive macromolecular compounds such as polyacene, poly-p-phenylene, polypyrrole, and polyaniline.

Among the above, composite oxides of lithium and one or more selected from transition metals such as cobalt, nickel, and manganese, which are generally called high-voltage materials, are preferred in terms of lithium ion releasing properties and ease of generation of high voltages. Specific examples of composite oxides of lithium and cobalt, nickel, and manganese include $LiCoO_2$, $LiMnO_2$, $LiMn_2O_4$, $LiNiO_2$, $LiNi_xCo_{(1-x)}O_2$, and $LiMn_aNi_bCo_c$ (a+b+c=1).

Positive electrode active materials obtained by doping these lithium composite oxides with a small amount of element such as fluorine, boron, aluminum, chromium, zirconium, molybdenum, or iron and positive electrode active materials obtained by surface treating the particle surface of the lithium composite oxides with, for example, carbon, MgO, $Al_2O_3$, or $SiO_2$ may also be used. These positive electrode active materials may also be used in combination of two or more.

The negative electrode active material used for a negative electrode of the lithium secondary battery may be any known active material that can intercalate and deintercalate metallic lithium or lithium ions. For example, carbon materials such as natural graphite, artificial graphite, non-graphitizable carbon, and graphitizable carbon may be used. In addition, metal materials such as metallic lithium, alloys, and tin compounds, lithium transition metal nitrides, crystalline metal oxides, amorphous metal oxides, silicon compounds, and conductive polymers may also be used. Specific examples include $Li_4Ti_5O_{12}$ and $NiSi_5C_6$.

The electrode active material used for an electrode for an electric double layer capacitor used as the power storage device of the present invention is typically an allotrope of carbon. Specific examples of the allotrope of carbon include activated carbons, polyacenes, carbon whiskers, and graphite, and powders or fibers thereof may be used. Preferred electrode active materials are activated carbons, and specific examples include activated carbons made of phenol resins, rayon, acrylonitrile resins, pitch, and coconut shells.

For electrode active materials used for electrodes for the above lithium ion capacitor, the electrode active material used for a positive electrode of the electrodes for the lithium ion capacitor may be any material that can reversibly carry lithium ions and anions such as tetrafluoroborate. Specifically, an allotrope of carbon is typically used, and electrode active materials used in electric double layer capacitors can be widely used.

The electrode active material used for a negative electrode of the electrodes for the lithium ion capacitor is a material that can reversibly carry lithium ions. Specifically, electrode active materials used in negative electrodes of lithium ion secondary batteries can be widely used. Preferably, for example, crystalline carbon materials such as graphite and non-graphitizable carbon and the polyacene materials (PAS) described also as the positive electrode active materials above may be used. These carbon materials and PAS are used in the form obtained by carbonizing a phenol resin or the like, optionally performing activation, and then performing pulverization.

The content of the electrode active materials in the electrode coating liquid composition of the present invention is not particularly limited and is 60 mass % or more and 97 mass % or less based on 100 mass % of the total solids.

As current collectors for the electrode active materials used for the power storage device of the present invention, any electron conductor that produces no adverse effects in an assembled battery may be used. For example, as a positive electrode current collector, aluminum, titanium, stainless steel, nickel, baked carbon, conductive polymer, conductive glass, or, alternatively, aluminum, copper, or the like surface-treated with carbon, nickel, titanium, silver, or the like for the purpose of improving adhesiveness, conductivity, and oxidation resistance may be used. As a negative electrode current collector, copper, stainless steel, nickel, aluminum, titanium, baked carbon, conductive polymer, conductive glass, Al—Cd alloy, or, alternatively, copper or the like surface-treated with carbon, nickel, titanium, silver, or the like for the purpose of improving adhesiveness, conductivity, and oxidation resistance may be used. The surface of these current collector materials may be subjected to oxidation treatment. The shape thereof may be foil-like, film-like, sheet-like, net-like, or the shape of a formed body such as a punched or expanded body, a lath body, a porous body, or a foamed body. The thickness thereof is typically, but not necessarily, 1 to 100 μm.

The electrodes of the power storage device of the present invention can be produced by, for example, mixing together an electrode active material, a conductive assistant, a current collector for the electrode active material, a binder that binds the electrode active material and the conductive assistant to the current collector, etc. to prepare a slurry electrode material, applying the electrode material to aluminum foil, copper foil, or the like serving as the current collector, and volatilizing a dispersion medium.

The method, order, etc. of mixing of the above electrode materials are not particularly limited. For example, the active material and the conductive assistant may be mixed in advance and used, and for the mixing in this case, a mortar, a mill mixer, a ball mill such as a planetary ball mill or a shaker ball mill, a mechanofusion, or the like may be used.

The separator used for the power storage device of the present invention may be any separator used for commonly used power storage devices, and examples thereof include porous resins made of polyethylene, polypropylene, polyolefin, polytetrafluoroethylene, and the like, ceramics, and nonwoven fabrics.

The electrolyte solution used for the power storage device of the present invention may be any electrolyte solution used for commonly used power storage devices, and commonly used electrolyte solutions such as organic electrolyte solutions and ion liquids may be used. Examples of electrolyte salts used for the power storage device of the present invention include $LiPF_6$, $LiBF_4$, $LiClO_4$, $LiAsF_6$, LiCl, LiBr, $LiCF_3SO_3$, $LiN(CF_3SO_2)_2$, $LiC(CF_3SO_2)_3$, LiI, $LiAlCl_4$, $NaClO_4$, $NaBF_4$, and NaI, and, in particular, inorganic lithium salts such as $LiPF_6$, $LiBF_4$, $LiClO_4$, and $LiAsF_6$ and organic lithium salts represented by $LiN(SO_2C_xF_{2x+1})(SO_2C_yF_{2y+1})$ may be used. Here, x and y each represent 0 or an integer of 1 to 4, and x+y is 2 to 8. Specific examples of organic lithium salts include $LiN(SO_2F)_2$, $LiN(SO_2CF_3)(SO_2O_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, and $LiN(SO_2C_2F_5)(SO_2C_4F_9)$. In particular, the use of $LiPF_6$, LiBF4, $LiN(CF_3SO_2)_2$, $LiN(SO_2F)_2$, or $LiN(SO_2C_2F_5)_2$ as the electrolyte advantageously provide excellent electrical properties. These electrolyte salts may be used alone or in combination of two or more. It is desired that these lithium salts be contained in the electrolyte solution at a concentration of typically 0.1 to 2.0 mol/L, preferably 0.3 to 1.5 mol/L.

The organic solvent for dissolving the electrolyte salt used for the power storage device of the present invention may be any organic solvent used for a non-aqueous electrolyte solution of a power storage device, and examples include carbonate compounds, lactone compounds, ether compounds, sulfolane compounds, dioxolane compounds, ketone compounds, nitrile compounds, and halogenated hydrocarbon compounds. Specific examples include carbonates such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate, and vinylene carbonate; lactones such as γ-butyl lactone; ethers such as dimethoxyethane, tetrahydrofuran, 2-methyltetrahydrofuran, tetrahydropyran, and 1,4-dioxane; sulfolanes such as sulfolane and 3-methylsulfolane; dioxolanes such as 1,3-dioxolane; ketones such as 4-methyl-2-pentanone;

nitriles such as acetonitrile, propionitrile, valeronitrile, and benzonitrile; halogenated hydrocarbons such as 1,2-dichloroethane; and other ionic liquids such as methyl formate, dimethylformamide, diethylformamide, dimethylsulfoxide, imidazolium salts, and quaternary ammonium salts. Furthermore, mixtures thereof may be used. Of these organic solvents, in particular, one or more non-aqueous solvents selected from the group consisting of carbonates are preferably contained because high electrolyte solvency, high permittivity, and high viscosity are provided.

When used for a polymer electrolyte or a macromolecular gel electrolyte in the power storage device of the present invention, a macromolecule or a crosslinked body thereof having a polymer or copolymer structure, which is a macromolecular compound, of ether, ester, siloxane, acrylonitrile, vinylidene fluoride, hexafluoropropylene, acrylate, methacrylate, styrene, vinyl acetate, vinyl chloride, oxetane, etc. may be used, and one kind or two or more kinds of macromolecules may be used. The macromolecular structure is particularly preferably, but not necessarily, a macromolecule having an ether structure, such as polyethylene oxide. Inorganic matter such as a metal oxide may also be used in combination. Any metal oxide used for a power storage device may be used, and examples include $SiO_2$, $Al_2O_3$, AlOOH, MgO, CaO, $ZrO_2$, $TiO_2$, $Li_7La_3Zr_2O_{12}$, and $Li_{xa}La_{ya}TiO_3$ [xa=0.3 to 0.7, ya=0.3 to 0.7], and $BaTiO_3$.

In the power storage device of the present invention, in the case of a liquid-type battery, an electrolyte solution is encased in a battery container; in the case of a gel-type battery, a precursor solution of a polymer dissolved in an electrolyte solution is encased in a battery container; and in the case of a solid electrolyte battery, an uncrosslinked polymer in which an electrolyte salt is dissolved is encased in a battery container.

The power storage device according to the present invention can be formed into any desired shape such as cylindrical, coin, prism, laminate, and other shapes. The basic configuration of the battery does not vary depending on the shape, and the design can be changed depending on the purpose. For example, a cylindrical battery is obtained as follows: a negative electrode obtained by applying a negative electrode active material to a negative electrode current collector and a positive electrode obtained by applying a positive electrode active material to a positive electrode current collector are wound with a separator interposed therebetween, the resulting wound body is encased in a battery can, a non-aqueous electrolyte solution is injected into the battery can, and the battery can is sealed with insulating plates mounted on upper and lower parts. In the case of a coin battery, a stack of a disk-like negative electrode, a separator, a disk-like positive electrode, and a stainless steel plate is encased in a coin-shaped battery can, a non-aqueous electrolyte solution is injected into the battery can, and the battery can is sealed.

EXAMPLES

Next, Examples will be described together with Comparative Examples. It should be noted that the present invention is not limited to these Examples. In Examples, "%" means % by mass, unless otherwise specified.

Synthesis of Polymer Component (Aqueous Resin Emulsion)

(Synthesis Example 1-2) Synthesis of Styrene-Butadiene Rubber Emulsion (SBR Emulsion) A-1

In a flask equipped with a stirrer, a reflux condenser, and a thermometer, 51 parts by mass of prepared water and 0.2 parts by mass of dodecylbenzene sulfonate were placed and heated to 40° C. Separately from this, a composition of a preliminary emulsified liquid, i.e., 5 parts by mass of acrylonitrile, 8 parts by mass of methyl methacrylate, 55 parts by mass of styrene, 32 parts by mass of 1,3-butadiene, and 0.95 parts by mass of alkylbenzene sulfonate were emulsified and dispersed in 40 parts by mass of prepared water to prepare a preliminary emulsified liquid. The preliminary emulsified liquid was dropped into the flask from a dropping funnel over 4 hours, while 0.4 parts by mass of a sodium persulfate initiator serving as a polymerization initiator was added in the form of a 10% aqueous solution, thereby initiating polymerization. After a reaction temperature of 65° C. was maintained for 4 hours, the temperature was increased to 80° C., and, subsequently, the reaction was continued for 2 hours to obtain an SBR emulsion A-1.

Preparation of Fibrous Nanocarbon Material Dispersion (Synthesis Example 2-1) Preparation of Fibrous Nanocarbon Material Dispersion B-1 (for Examples)

In a beaker, 1.0 g of a SWCNT (TUBALL BATT manufactured by OCSiAL, CNT purity: >93%, average diameter: 1.6±0.5 nm), 45 g of a 2 wt % aqueous solution of a carboxymethylcellulose salt (CELLOGEN 7A manufactured by DKS Co., Ltd., 2 wt % aqueous solution viscosity (25° C.): 12 to 18 mPa·s, C-1 in Table 2), and 5 g of a 2 wt % aqueous solution of a cellulose nanofiber (RHEOCRYSTA I-2SX-LDS manufactured by DKS Co., Ltd., D-1 in Table 2) were mixed together and stirred, after which a Nihonseiki Kaisha US-600T ultrasonic homogenizer, a circulation unit, and a tube pump were connected to the beaker, and the slurry was dispersed at a current of 100 uA for 90 minutes while being circulated to obtain a fibrous nanocarbon material dispersion B-1.

(Synthesis Example 2-2) Preparation of Fibrous Nanocarbon Material Dispersion B-2 (for Examples)

A fibrous nanocarbon material dispersion B-2 was prepared in the same manner as in Synthesis Example 2-1 except that the 2 wt % aqueous solution of the carboxymethylcellulose salt (CELLOGEN 7A manufactured by DKS Co., Ltd.) was replaced with a 2 wt % aqueous solution of a carboxymethylcellulose salt (WS-C manufactured by DKS Co., Ltd., C-2 in Table 2).

(Synthesis Example 2-3) Preparation of Fibrous Nanocarbon Material Dispersion B-3 (for Examples)

A fibrous nanocarbon material dispersion B-3 was prepared in the same manner as in Synthesis Example 2-1 except that the conditions of the treatment with the ultrasonic homogenizer were changed to 100 uA and 120 minutes.

(Synthesis Example 2-4) Preparation of Fibrous Nanocarbon Material Dispersion B'-1 (for Comparative Examples)

A fibrous nanocarbon material dispersion B'-1 was prepared in the same manner as in Synthesis Example 2-1 except that the conditions of the treatment with the ultrasonic homogenizer were changed to 200 uA and 240 minutes.

(Synthesis Example 2-5) Preparation of Fibrous Nanocarbon Material Dispersion B'-2 (for Examples)

A fibrous nanocarbon material dispersion B'-2 was prepared in the same manner as in Synthesis Example 2-1 except that 45 g of the 2 wt % aqueous solution of the carboxymethylcellulose salt (CELLOGEN 7A manufactured by DKS Co., Ltd.) and 5 g of the 2 wt % aqueous solution of the cellulose nanofiber (RHEOCRYSTA I-2SX-LDS manufactured by DKS Co., Ltd.) to be added were changed to 50 g of the carboxymethylcellulose salt (CELLOGEN 7A manufactured by DKS Co., Ltd.) alone.

(Synthesis Example 2-6) Preparation of Fibrous Nanocarbon Material Dispersion B'-3 (for Examples)

A fibrous nanocarbon material dispersion B'-3 was prepared in the same manner as in Synthesis Example 2-1 except that the amount of the 2 wt % aqueous solution of the carboxymethylcellulose salt (CELLOGEN 7A manufactured by DKS Co., Ltd.) was changed from 45 g to 10 g, and the amount of the 2 wt % aqueous solution of the cellulose nanofiber (RHEOCRYSTA I-2SX-LDS manufactured by DKS Co., Ltd.) was changed from 5 g to 40 g.

[Evaluation of Fibrous Nanocarbon Material Dispersions]

The average fiber width and the average fiber length of the fibrous nanocarbon material dispersions were observed using a scanning probe microscope (SPM) (AFM-5300E manufactured by JEOL Ltd.). Specifically, each fibrous nanocarbon dispersion was diluted to a solid concentration of 0.01 wt % and then cast on a mica substrate. An AFM image of the dried sample was observed, and the average fiber width and the average fiber length were determined according to the above-described method. Using these values, an aspect ratio was calculated by formula 1 below.

Aspect ratio=average fiber length (nm)/average fiber width (nm)         (formula 1)

The measurement results are shown in Table 1. The fibrous nanocarbon material dispersions B-1 to B-3 for Examples had an average fiber width in the range of 1 to 200 nm and an average fiber length of 0.5 μm or more. By contrast, the cellulose fiber B'-1 for Comparative Examples had an average fiber length out of the above range.

TABLE 1

|  | B-1 | B-2 | B-3 | B'-1 | B'-2 | B'-3 |
| --- | --- | --- | --- | --- | --- | --- |
| Average fiber width | 3 | 4 | 2 | 2 | 4 | 5 |
| Average fiber length | 3200 | 3500 | 1500 | 400 | 2800 | 2200 |
| Aspect ratio | 1067 | 875 | 750 | 200 | 700 | 440 |

[Fabrication of Coating and Electrode]
(Negative Electrode 1)

A mixture of 95 parts of SiO (average particle size: 4.5 μm, specific surface area: 5.5 m$^2$/g) and graphite (average particle size: 18 μm, specific surface area: 3.2 m$^2$/g) (content ratio: 20/80) serving as a negative electrode active material, 2 parts of acetylene black (Li-400 manufactured by Denka Company Limited, F-1 in Table 2) serving as a conductive assistant, 0.8 parts of a carboxymethylcellulose salt (WS-C manufactured by DKS Co., Ltd., G-1 in Table 2) serving as a dispersant and binder, 2 parts (on a solid basis) of the SBR emulsion A-1 (A-1 in Table 2) serving as a polymer component, and 0.2 parts (on a solid basis) of the fibrous nanocarbon material dispersion B-1 was stirred with a homodisper to prepare a negative electrode slurry so as to have a solid content of 40%. The negative electrode slurry was applied to electrolytic copper foil with a thickness of 10 μm by using a roll coater (manufactured by Thank-Metal Co., Ltd., product name: Micro Coater), dried at 120° C., and then roll-pressed to obtain a negative electrode 1 with a negative electrode active material weight of 7 to 8 mg/cm$^2$.

(Negative Electrodes 2 and 3)

Negative electrode 2 and 3 were fabricated in the same manner as the negative electrode 1 except that the fibrous nanocarbon material dispersion B-1 was replaced with B-2 and B-3 shown in Table 1, respectively.

(Negative Electrode 4)

A negative electrode 4 with a negative electrode active material weight of 8 to 9 mg/cm$^2$ was fabricated in the same manner as the negative electrode 3 except that 96 parts of SiO (average particle size: 4.5 μm, specific surface area: 5.5 m$^2$/g) and graphite (average particle size: 18 μm, specific surface area: 3.2 m$^2$/g) (content ratio: 10/90) were used as a negative electrode active material, 1.5 parts of acetylene black were used as a conductive assistant, and 1.5 parts (on a solid basis) of the SBR emulsion A-1 were used as a polymer component.

(Negative Electrode 5)

A negative electrode 5 with a negative electrode active material weight of 5 to 6 mg/cm$^2$ was fabricated in the same manner as the negative electrode 3 except that 92 parts of SiO (average particle size: 4.5 μm, specific surface area: 5.5 m$^2$/g) and graphite (average particle size: 18 μm, specific surface area: 3.2 m$^2$/g) (content ratio: 30/70) were used as a negative electrode active material, 2.5 parts of acetylene black were used as a conductive assistant, 1.3 parts of the carboxymethylcellulose salt were used as a dispersant and binder, and 4 parts (on a solid basis) of the SBR emulsion A-1 were used as a polymer component.

(Negative Electrode 6)

A negative electrode 6 was fabricated in the same manner as the negative electrode 3 except that 92 parts of SiO (average particle size: 7 μm, specific surface area: 2.2 m$^2$/g) and graphite (average particle size: 18 μm, specific surface area: 3.2 m$^2$/g) (content ratio: 20/80) were used as a negative electrode active material, 1.8 parts of the carboxymethylcellulose salt were used as a dispersant and binder, and 4 parts (on a solid basis) of the SBR emulsion A-1 were used as a polymer component.

(Negative Electrode 7)

A negative electrode 7 with a negative electrode active material weight of 5 to 6 mg/cm$^2$ was fabricated in the same manner as the negative electrode 3 except that 94 parts of Si (average particle size: 2.6 μm, specific surface area: m$^2$/g) and graphite (average particle size: 18 μm, specific surface area: 3.2 m$^2$/g) (content ratio: 10/90) were used as a negative electrode active material, and 3 parts (on a solid basis) of the SBR emulsion A-1 were used as a polymer component.

(Negative Electrode 8)

A negative electrode 8 with a negative electrode active material weight of 5 to 6 mg/cm$^2$ was fabricated in the same manner as the negative electrode 3 except that 93 parts of Si (average particle size: 10 nm, specific surface area: m$^2$/g) and graphite (average particle size: 18 μm, specific surface area: 3.2 m$^2$/g) (content ratio: 10/90) were used as a negative electrode active material, 2.3 parts of acetylene black were used as a conductive assistant, 1.0 parts of the carboxymethylcellulose salt were used as a dispersant and binder, and 3.5 parts (on a solid basis) of the SBR emulsion A-1 were used as a polymer component.
(For Comparative Examples)
(Negative Electrode 9)

A negative electrode 9 was fabricated in the same manner as the negative electrode 4 except that 90.5 parts of SiO (average particle size: 4.5 μm, specific surface area: 5.5 $m^2/g$) and graphite (average particle size: 18 μm, specific surface area: 3.2 $m^2/g$) (content ratio: 20/80) were used as a negative electrode active material, 1.3 parts of acetylene black were used as a conductive assistant, 1.3 parts of the carboxymethylcellulose salt were used as a dispersant and binder, and 6 parts of a polyacrylic acid sodium salt A'-1 (molecular weight Mw=130,000) were used as a polymer component in place of 1.5 parts (on a solid basis) of the SBR emulsion A-1.
(Negative Electrode 10)

A negative electrode 10 was fabricated in the same manner as the negative electrode 1 except that the fibrous nanocarbon material B-1 was replaced with B'-1 shown in Table 1.
(Negative Electrode 11)

A negative electrode 11 was fabricated in the same manner as the negative electrode 10 except that conditions under which the fibrous nanocarbon material dispersion B'-1 was not used was employed, 2.1 parts of acetylene black were used as a conductive assistant, and 0.9 parts of the carboxymethylcellulose salt were used as a dispersant and binder.
(Negative Electrodes 12 and 13)

Negative electrodes 12 and 13 were fabricated in the same manner as the negative electrode 10 except that the fibrous nanocarbon dispersion B'-1 was replaced with B'-2 and B'-3 shown in Table 1, respectively.
(Coating Physical Properties Evaluation)
(Viscosity Evaluation and Coatability Evaluation)

The viscosity immediately after fabrication of the negative electrode slurries obtained above was measured with a rotational viscometer (product name: TVB-10M manufactured by Toki Sangyo Co., Ltd.), and the value of viscosity at two minutes from the start of measurement was read (rotational speed at evaluation: 6 rpm). The coating uniformity at the time when the coatings obtained above were each applied with a roll coater was evaluated according to the following criteria. The evaluation results are shown in Table 2 below.
Evaluation Criteria:

◯: The coating has a viscosity of 8000 mPa or less, and can be applied to be uniformly thick.

Δ: The coating has a viscosity of 8000 mPa or more, and the thickness is ununiform (e.g., streaked).

x: The coating has a viscosity of 8000 mPa or more, and is impossible to apply.

[Conductivity of Electrode]

The negative electrode slurries obtained above were each applied to a PET sheet and dried, and electrodes having a density increased to 1.2 g/$cm^3$ with a roll pressing machine (manufactured by Thank-Metal Co., Ltd.) were fabricated. The electrodes obtained were measured for conductivity using a resistivity meter (Loresta GP manufactured by Mitsubishi Chemical Analytech Co., Ltd.) and expressed as an index with the value of Comparative Example 2 taken as 100. Higher indices indicate higher conductivity. The evaluation results are shown in Table 2.
[Evaluation of Battery Performance]
(Fabrication of Positive Electrode for Evaluation)

One hundred parts by mass of $LiNi_{0.8}Co_{0.15}Al_{0.05}O_2$ (NCA), a positive electrode active material, 7.8 parts by mass of acetylene black (Li-400 manufactured by Denka Company Limited) serving as a conductive assistant, 6 parts by mass of polyvinylidene fluoride serving as a binder, and 61.3 parts by mass of N-methyl-2-pyrrolidone serving as a dispersion medium were mixed together using a planetary mixer to prepare a positive electrode slurry so as to have a solid content of 65%. The positive electrode slurry was applied to aluminum foil with a thickness of 15 μm by using a coating machine, dried at 130° C., and then roll-pressed to obtain a positive electrode with a positive electrode active material weight of 22 mg/$cm^2$.
[Fabrication of Lithium Secondary Battery]

The positive electrode and each negative electrode obtained above were combined as shown in Table 2 below. The electrodes were stacked on top of each other with a polyolefin (PE/PP/PE) separator interposed therebetween, and a positive electrode terminal and a negative electrode terminal were ultrasonically welded to the positive electrode and the negative electrode, respectively. The stack was placed in an aluminum laminate package, and the package was heat-sealed except for an opening for electrolyte injection. A battery before electrolyte injection with a positive electrode area of 18 $cm^2$ and a negative electrode area of 19.8 $cm^2$ was fabricated. Next, an electrolyte solution obtained by dissolving $LiPF_6$ (1.0 mol/L) in a mixed solvent of ethylene carbonate and diethyl carbonate (30/70 by volume) was injected, and the opening was heat-sealed to obtain a battery for evaluation.
[Evaluation of Battery Performance]

The lithium secondary batteries fabricated were subjected to a performance test at 20° C. The test method is as described below. The test results are shown in Table 2.
(Charge-Discharge Cycle Characteristics)

The charge-discharge cycle characteristics were measured under the following conditions. A cycle of CC (constant current) charging at a current density corresponding to 0.5 C to 4.2 V, switching to CV (constant voltage) charging at 4.2 V and performing charging for 1.5 hours, and CC discharging at a current density corresponding to 0.5 C to 2.7 V was performed 300 times at 20° C., and the ratio of a 1 C discharge capacity after the 300 cycles to a 1 C discharge capacity at the first cycle was determined as a 1 C charge-discharge cycle retention.

TABLE 2

|  | Example 1 Negative electrode 1 | Example 2 Negative electrode 2 | Example 3 Negative electrode 3 | Example 4 Negative electrode 4 | Example 5 Negative electrode 5 | Example 6 Negative electrode 6 | Example 7 Negative electrode 7 | Example 8 Negative electrode 8 |
|---|---|---|---|---|---|---|---|---|
| Polymer component | A-1 | A-1 | A-1 | A-1 | A-1 | A-1 | A-1 | A-1 |
| Fibrous nanocarbon material | B-1 | B-2 | B-3 | B-1 | B-1 | B-1 | B-1 | B-1 |

TABLE 2-continued

| | | | | | | | | |
|---|---|---|---|---|---|---|---|---|
| Cellulose material | C-1 | C-2 | C-1 | C-1 | C-1 | C-1 | C-1 | C-1 |
| Nanocellulose fiber | D-1 | D-1 | D-1 | D-1 | D-1 | D-1 | D-1 | D-1 |
| Negative electrode active material | E-1 | E-1 | E-1 | E-2 | E-3 | E-4 | E-5 | E-6 |
| Conductive assistant | F-1 | F-1 | F-1 | F-1 | F-1 | F-1 | F-1 | F-1 |
| Dispersant and binder | G-1 | G-1 | G-1 | G-1 | G-1 | G-1 | G-1 | G-1 |
| Coating physical properties evaluation (viscosity evaluation and coatability evaluation) | ○ | ○ | ○ | ○ | ○ | ○ | ○ | ○ |
| Conductivity evaluation of dried electrode | 189 | 183 | 169 | 194 | 141 | 151 | 132 | 119 |
| Charge-discharge cycle characteristics | 94 | 93 | 91 | 95 | 83 | 87 | 82 | 80 |

| | Comparative Example 1 Negative electrode 9 | Comparative Example 2 Negative electrode 10 | Comparative Example 3 Negative electrode 11 | Comparative Example 4 Negative electrode 12 | Comparative Example 5 Negative electrode 13 |
|---|---|---|---|---|---|
| Polymer component | A'-1 | A-1 | A-1 | A-1 | A-1 |
| Fibrous nanocarbon material | B-1 | B'-1 | — | B'-2 | B'-3 |
| Cellulose material | C-1 | C-1 | — | C-1 | C-1 |
| Nanocellulose fiber | D-1 | D-1 | — | — | D-1 |
| Negative electrode active material | E-1 | E-1 | E-1 | E-1 | E-1 |
| Conductive assistant | F-1 | F-1 | F-1 | F-1 | F-1 |
| Dispersant and binder | G-1 | G-1 | G-1 | G-1 | G-1 |
| Coating physical properties evaluation (viscosity evaluation and coatability evaluation) | ○ | ○ | ○ | Δ | x |
| Conductivity evaluation of dried electrode | 111 | 100 | 76 | 167 | — |
| Charge-discharge cycle characteristics | 69 | 59 | 32 | 91 | — |

It can be seen from Table 2 that as compared to the negative electrodes 1 to 8 used in Examples 1 to 8, the negative electrode 10 in which B'-1, which is a fibrous nanocarbon material having a shorter average fiber length, is used has poor electrode conductivity and poor binding properties, and thus the lithium secondary battery of Comparative Example 2 produced using this negative electrode has poor charge-discharge cycle characteristics. It can also be seen that the negative electrode 9 in which sodium polyacrylate is used as a polymer component also has poor binding properties, and the lithium secondary battery of Comparative Example 1 produced using this negative electrode has poor charge-discharge cycle characteristics.

It can also be seen that the negative electrode 11 in which no fibrous nanocarbon materials are used has poor binding properties and electrode conductivity, and the battery performance of the lithium secondary battery of Comparative Example 3 produced using this negative electrode is much worse than the battery performance of Examples 1 to 8.

Furthermore, the negative electrode 12 in which no nanocellulose fibers are used in the fibrous nanocarbon dispersion has poor coating physical properties, and the negative electrode 13 in which the content of the nanocellulose fiber relative to the fibrous nanocarbon dispersion is excessively high has excessively high thixotropic properties of the electrode coating composition, thus failing to achieve normal coating and provide a uniform electrode.

INDUSTRIAL APPLICABILITY

The electrode binder composition of the present invention can be used as a binder for, for example, an active material of a power storage device, and the electrode produced using the electrode binder composition is used to produce various power storage devices. The power storage devices produced can be used for various portable devices such as cellular phones, notebook computers, personal digital assistants (PDA), video cameras, and digital cameras and, furthermore, can be used as medium-sized and large-sized power storage devices mounted in power-assisted bicycles, electric vehicles, and others.

The invention claimed is:

1. An electrode binder composition comprising (A) one or more polymer components selected from the group consisting of fluoropolymers, butadiene polymers, and thermoplastic elastomers, (B) a fibrous nanocarbon material having an average fiber diameter of 0.5 nm or more and 20 nm or less and an average fiber length of 0.5 μm or more and 1 mm or less, (C) a cellulose material, (D) a nanocellulose fiber, and (E) water, wherein a mass ratio of the component (A) to the component (B) satisfies (A)/(B)=60/40 to 98/2.

2. The composition according to claim 1, wherein a mass ratio of the component (C) to the component (D) satisfies (C)/(D)=30/70 to 98/2.

3. The electrode binder composition according to claim 1, wherein a 2 mass % aqueous solution of (C) the cellulose material has a viscosity (25° C.) of 500 mPa·s or less.

4. An electrode coating liquid composition comprising the electrode binder composition according to claim 1, an active material, and a dispersant,
   wherein the component (A) is contained in an amount of 0.1 mass % or more and 10 mass % or less relative to a solid content of the electrode coating liquid composition, the component (B) is contained in an amount of 0.06 mass % or more and 2 mass % or less relative to the solid content of the electrode coating liquid composition, and the component (C) is contained in an amount of 0.06 mass % or more and 3 mass % or less relative to the solid content of the electrode coating liquid composition.

5. A power storage device electrode produced using the electrode coating liquid composition according to claim 4.

6. A power storage device comprising the power storage device electrode according to claim 5.

7. The composition according to claim 1, wherein the one or more polymer components (A) is selected from the group consisting of polyvinylidene fluoride, copolymers of polyvinylidene fluoride with hexafluoropropylene, perfluoromethyl vinyl ether, or tetrafluoroethylene, polytetrafluoroethylene, fluorocarbon rubber, styrene-butadiene rubber, ethylene-propylene rubber, and styrene-acrylonitrile copolymers, polyurethane resins, polyester resins, polyimide resins, polyamide resins, and epoxy resins.

8. The composition according to claim 1, wherein a mass ratio of the cellulose material (C) to the nanocellulose fiber (D) is (C)/(D)=50/50 to 90/10.

9. The electrode binder composition according to claim 1, wherein a total amount of the cellulose material (C) and the nanocellulose fiber (D) is 5 parts by mass or more and 150 parts by mass or less relative to 100 parts by mass of the fibrous nanocarbon material (B).

\* \* \* \* \*